Aug. 7, 1951     P. H. TAYLOR     2,563,433
OPTICAL SYSTEM FOR REFLECTING MIRROR TELESCOPE
Filed April 7, 1950

INVENTOR:
Philip H. Taylor
BY Herbert E. Metcalf
HIS PATENT ATTORNEY

Patented Aug. 7, 1951

2,563,433

UNITED STATES PATENT OFFICE 2,563,433

OPTICAL SYSTEM FOR REFLECTING MIRROR TELESCOPE

Philip H. Taylor, Los Angeles, Calif., assignor to Northrop Aircraft, Inc., Hawthorne, Calif., a corporation of California Application April 7, 1950, Serial No. 154,583

3 Claims. (Cl. 88—57)

This invention relates to the use of lenses of zero-power for the correction of mirror aberrations in a mirror telescopic system.

It is an object of this invention to provide a suitable lens of zero-power as a corrector plate for the correction of mirror aberrations by a transmitting element.

The correction of mirror aberrations by a transmitting element was first accomplished by Schmidt who used an aspheric plate at an aperture stop located at the center of curvature of a concave spherical mirror. D. D. Maksutov and A. Bouwers, some years later, developed meniscus correctors having all-spherical surfaces. The suggestion has also been made of combining menisci with Schmidt type plates to achieve an even higher order of correction.

Figure 1:
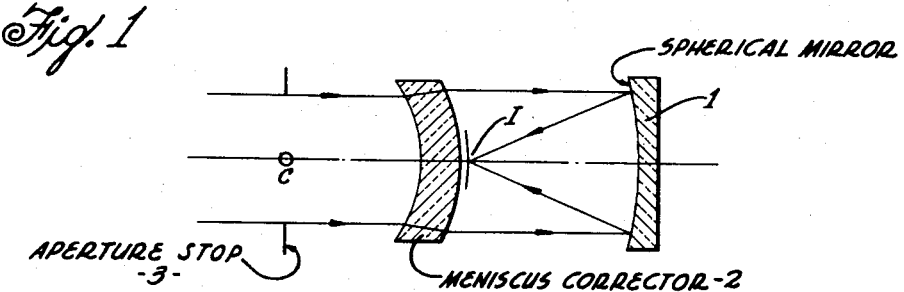
Figure 1 is a diagram showing a typical system of the Maksutov type. This particular example is shown monocentric for simplicity, though more generalized forms are common.

In Figure 1, a spherical mirror 1 is positioned behind a meniscus corrector 2, with an aperture stop 3 in front of the meniscus corrector 2. All surfaces and the image field I are centered at C in the axis of the system in the aperture stop plane.

When an attempt is made to design an instrument of the Maksutov type, of Figure 1, it is seen at once that an aberration-free scheme can be achieved easily at, say, about f/10 and with modest apertures of four to six inches. If the designer then attempts to increase the speed and/or the focal length, three difficulties are encountered:

First, color becomes unpleasantly large. This can be controlled by making the meniscus a cemented doublet comprised of two glasses having the same index for sodium light, but with different dispersions. This device has only a limited application for, at very high aperture ratios (f/3 or faster), the lateral color introduced at the cemented surface, whose center of curvature is far removed from that common to the others, becomes too large for high-quality imagery.

Secondly, one of the parameters for the control of spherical aberration (the only one in the monocentric case) is the thickness of the meniscus. In large, fast systems, the unpleasant alternatives of a relatively thin lens with steep curves, or a thick one with mild curves must be faced. The former will produce problems in the optical shop, and the latter will lead to a lens which is difficult to manufacture and which requires a high degree of homogeneity.

A third defect of the meniscus corrector is even more serious. When the marginal and paraxial foci are exactly joined, the higher orders of spherical aberration lead to a residual which reaches a maximum at the zone $$\left(\frac{\text{full aperture}}{\sqrt{2}}\right)$$

This increases steadily with aperture and speed, until at a focal length of two inches, working at f/1, the zonal is about 120 times that permissible for perfect image production.

A new approach to the problem according to the present invention is to employ, instead of the negative power menisci, a lens of zero power which contributes solely to the spherical aberration produced by the mirror or mirrors of the system.

Figure 2:
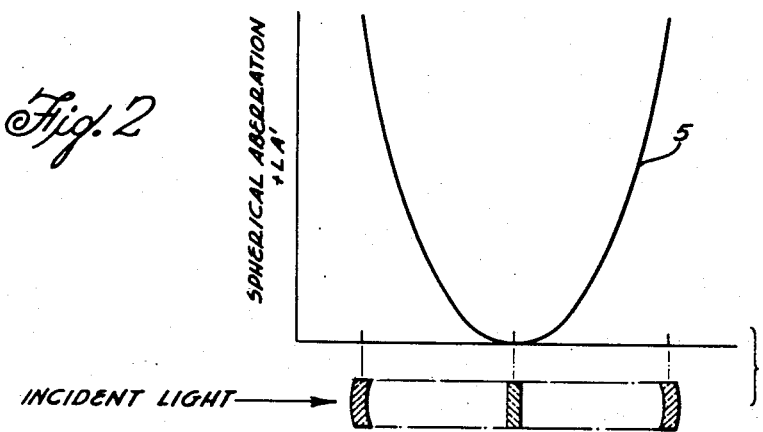
Figure 2 is a graph showing the spherical aberrations of a zero power lens formed from a single piece of glass.
Figure 3:
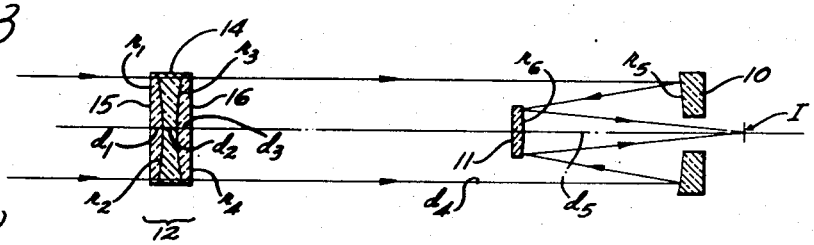
Figure 3 is a diagram of a 44.5 inch f/6.4 telescope embodying the present invention.
Figure 4:
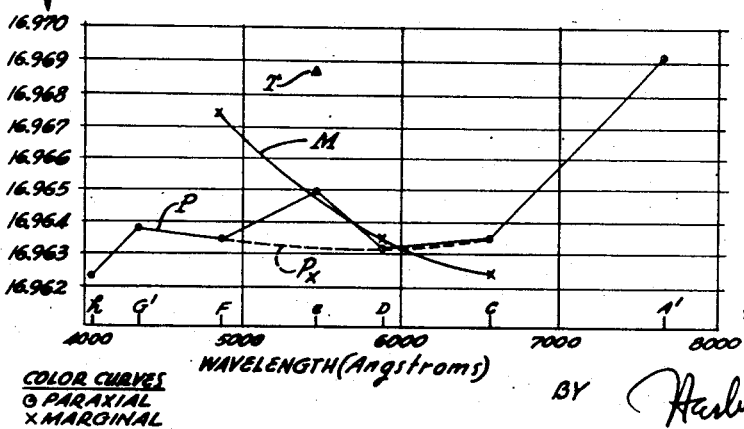
Figure 4 is a graph showing color curves for the system of Figure 3.

The present invention may be more fully understood by reference to Figures 2, 3 and 4.

A few simple trials show that a zero-power lens cannot be made of a single piece of glass, for such a lens is always afflicted with positive spherical aberration just like the mirror. The combined system will then be worse than the mirror alone unless the "corrector" is allowed to degenerate into a plane parallel plate. The result of bendings is shown qualitatively by the curve 5 of Figure 2.

Negative spherical aberration can, however, be achieved with a compound zero power lens. An exceedingly simple but useful form, and the one entering into the present invention is that of a symmetrical cemented triplet made of a central equi-concave flint element, flanked by two identical crown elements. The inverse of the achromatization trick mentioned above is used, and two glasses having the same "V values" but whose indices differ widely are chosen. Throughout the corrective process, symmetry is retained, not only because it is the natural form for zero-power (or any other lens used at unit magnification) but also because coma, lateral color, and distortion are, thereby, automatically reduced to zero.

One preferred system embodying the present invention is one of eight inches aperture and 44.5 inches focal length, assembled as shown in Figure 3.

Here, an apertured primary concave mirror 10 is used, reflecting light to a smaller secondary concave mirror 11 and then through the aperture in the primary mirror to an image field I behind the primary mirror 10. Corrections are provided by a compound zero power lens 12 formed from a central equi-concave flint glass element 14 flanked by two identical crown glass elements 15 and 16, the interfaces of the latter being cemented to the central element. In the figure, the various lens and mirror surface radii $r$ are each numbered by subscripts from front to rear of the system; $d_1$, $d_2$ and $d_3$ are respectively the axial thicknesses of the front crown element 15, the central flint element 14 and the rear crown element 16 respectively, while $d_4$ is the axial distance between the primary mirror surface and the surface $r_4$, and $d_5$ is the axial distance between secondary mirror surface $r_5$ and the image field I.

Because of the central cylinder blocked from the beam by the secondary (convex) mirror 11, the effective aperture of this preferred system is 7.0 inches and the speed is f/6.4. The following table gives the prescription, and the aberrations with their tolerances of the preferred system illustrated in Figure 3.

For definition of symbols and abbreviations of Table I, the standard text book of A. E. Conrady entitled "Applied Optics and Optical Design," Oxford University Press, 1929 is referred to.

Table

| Prescription | V | $N_D$ | $N_C$ | $N_F$ | $N_h$ | $N_{A'}$ |
|---|---|---|---|---|---|---|
| $r_1 =$ 136.59 | | | | | | |
| $d_1 =$ 1.00 C-1 | 58.6 | 1.5230 | 1.52036 | 1.52929 | 1.53819 | 1.51729 |
| $r_2 =$ −22.236 (cemented) | | | | | | |
| $d_2 =$ 1.00 DBC-1 | 58.8 | 1.6110 | 1.60793 | 1.61832 | 1.62837 | 1.60439 |
| $r_3 =$ 22.236 (cemented) | | | | | | |
| $d_3 =$ 1.00 C-1 | 58.6 | 1.5230 | 1.52036 | 1.52929 | 1.53819 | 1.51729 |
| $r_4 =$ −136.59 | | | | | | |
| $d_4 =$ 38.50 | | | | | | |
| $r_5 =$ −40.000 Mirror | | | | | | |
| $d_5 =$ −12.500 | | | | | | |
| $r_6 =$ −27.500 Mirror | | | | | | |

Mirror 1 (Concave primary, $r = -40.0$):
    Clear diameter = 8.8 inches.
    Thickness = 1.5 inches.
    Diam. central hole = 3.0 inches (clear).
    Material: Pyrex.
Mirror 2 (Convex secondary, $r = -27.5$):
    Clear diameter = 3.6 inches (.05 to .10 holding margin).
    Thickness = .75 inch.
    Material: Pyrex.
Optical constants and aberrations:
    $f' = 44.47$ inches.
    $U'_M = 5.160°$, $\sin U'_M = .08994$, f/6.4.
    Rear surface of mirror 1 to focal plane = 2.9 inches.
    Full field = 1°.

$l'_D = 16.96314$    $l'_{A'} = 16.96911$    $H' = '_{ab} = .3882$
$l'_C = 16.96342$    $l'_h = 16.96253$
$l'_F = 16.96343$ $L'_D = 16.96353$
$L'_F = 16.96745$

|  | PerCent Tolerance Attained |
|---|---|
| $LA'_D = -.00039 \pm .01088$ | 3.6 |
| $LZA'_D = +.00106 \pm .01632$ | 6.5 |
| $LA'_F = -.00401 \pm .00938$ | 42.8 |
| $LA'_C = +.00100 \pm .01284$ | 8.8 |
| $l'_C - l'_F = -.00001 \pm .00272$ | 0.4 |
| $l'_{C,F} - l'_D = +.00028 \pm .00332$ | 8.4 |
| $l'_C - l'_h = +.00089 \pm .00272$ | 32.7 |
| $l'_{A'} - l'_h = +.00658 \pm .00272$ | 242. |
| Coma'$_S = -.000034 \pm .000122$ | 27.9 |
| Distortion $= +.000007$ | Negligible |
| $\{$Astigmatism$\} = -.00001 \pm .001$ | 1.0 |
| $\{X \tan U'_M\}$ | |

Where
C-1 is a type of crown glass whose characteristics are well known in the art and are given in the "Bausch and Lomb" catalog and other catalogs of optical glass;
DBC-1 is a dense barium crown glass;

$$V = \frac{N_{D-1}}{N_F - N_C};$$

$N_D$ is the index of refraction for the D line of sodium (5893 Å.);
$N_C$ is the index of refraction for the C line of hydrogen (6563 Å.);
$N_F$ is the index of refraction for the F line of hydrogen (4861 Å.);
$N_h$ is the index of refraction for the h line of mercury (4047 Å.);
$N_{A'}$ is the index of refraction for the A' line of potassium (7665 Å.);
$r$ is the radius length for an element surface; and
$d$ is the axial thickness of an element.

Color curves of this system are shown in Figure 4 where curve P is the paraxial color curve, and curve M is the marginal color curve. Between 4000 and 6600 angstroms the paraxial curve P exhibits the general type of achromatism associated with apochromatic systems. Its erratic course need not be cause for any concern as the scattering is brought about by "rounding-off" errors in the indices. During design, a check can be made by varying each glass type by unity in the fifth place of decimals, and in opposite directions, for "e light." This procedure gave rise to the point within the triangle T, showing clearly that even the point at A' does not represent a real departure from complete achromatism over the 3600 angstrom region represented.

The curves show, however, the great importance of obtaining indices for each optical disc, accurate to at least unity in the fifth place. Five units in the sixth place leads to a better instrument.

Recent interferometric tests of first quality "Bausch and Lomb" optical glass show that the index variation within an optical disc one inch thick is about three to five to five units in the sixth place, per inch of surface. Therefore, there is little use insisting on knowing the average index to a higher accuracy than this.

The dashed curve $P_x$ of Figure 4 is simply that which would be true physically if it could be ascertained that the tabular F, D and C indices were really followed by two zeros. The difference between this and the marginal plot shown is "chromatic difference of spherical aberration," and is real, being quite independent of the tabular indices and dependent only upon the radii and the accuracy of the traces (eight place).

The advantages of the instrument of the present invention over the prior telescopes mentioned are the following:

1. Over a single-mirror Schmidt:
    (a) Tube length $= f'$ instead of $2f'$.
    (b) Spherical corrector.
    (c) Chromatically corrected.
    (d) Accessible image.
2. Over a two-mirror Schmidt:
    (a) Spherical corrector plate.
    (b) Chromatically corrected.
3. Over a Maksutov meniscus—corrected reflector:
    (a) No zonal spherical aberration.
    (b) Less steep curves or thinner corrector plate.
    (c) No secondary color.
    (d) Capable of greater speed at a given focal length, while holding the aberrations within bounds.
    (e) Longitudinal placement and tilting of the corrector plate relatively uncritical.
4. Over a cassegrainian reflector:
    (a) All spherical optics.

(b) Much larger field.
5. Over refractors having moderately wide fields:
  (a) No secondary color if used in the F to C region.
  (b) Simplicity of design and manufacture.
  (c) No zonal spherical aberration.
  (d) Ability to cover several thousand angstroms spectral range.
  (e) No extra-axial aberrations.

The disadvantages with respect to the various types of optical systems mentioned above are referred to by number.

1. Alignment of two mirrors.
2. (None).
3. (None).
4. Longer tube length for a given focal length.
5. (a) Spacing of the mirrors must be held closely.
  (b) Longer tube length than is obtainable in telephotos of identical focal length.
  (c) Spherical field.
  (d) Clear aperture about 12% greater than effective aperture.

It should be pointed out that, for some applications, 5 (c) and (d) are no disadvantage and, unless the telephoto type is being discussed, the tube lengths are exactly equal, in both cases, to the focal length.

The telescope with two spherical mirrors and the spherical triplet corrector element of zero power as described and claimed herein is believed to be superior to any telescope previously designed when the highest quality of images over a field of six degrees or less is desired.

What is claimed is:

1. A two mirror telescope comprising from rear to front, an apertured concave primary mirror, a secondary coaxial convex mirror of smaller diameter positioned to reflect light through the aperture in said primary mirror to an image field behind said primary mirror, and a compound zero power corrector lens in front of said secondary mirror and transmitting light to said primary mirror past said secondary mirror, said zero power lens consisting of a central equi-concave flint glass element flanked by two identical crown glass elements having convex surfaces cemented to the concave surfaces of said central element, the two crown elements and said flint glass element having the same V values but having different indices of refraction.

2. A two mirror telescope comprising from rear to front, an apertured concave primary mirror, a secondary coaxial convex mirror of smaller diameter positioned to reflect light through the aperture in said primary mirror to an image field behind said primary mirror, and a compound zero power corrector lens in front of said secondary mirror and transmitting light to said primary mirror past said secondary mirror, said zero power lens consisting of a central equi-concave flint glass element flanked by two identical crown glass elements having convex surfaces cemented to the concave surfaces of said central element, said telescope having the following prescription:

| Prescription | | V | $N_D$ | $N_C$ | $N_F$ | $N_h$ | $N_{A'}$ |
|---|---|---|---|---|---|---|---|
| $r_1 = 136.59$ | | | | | | | |
| $d_1 = 1.00$ | C-1 (cemented) | 58.6 | 1.5230 | 1.52036 | 1.52929 | 1.53819 | 1.51729 |
| $r_2 = -22.235$ | | | | | | | |
| $d_2 = 1.00$ | DBC-1 (cemented) | 58.8 | 1.6110 | 1.60793 | 1.61832 | 1.62837 | 1.60439 |
| $r_3 = 22.236$ | | | | | | | |
| $d_3 = 1.00$ | C-1 | 58.6 | 1.5230 | 1.52036 | 1.52929 | 1.53819 | 1.51729 |
| $r_4 = -136.59$ | | | | | | | |
| $d_4 = 38.50$ | | | | | | | |
| $r_5 = -40.000$ | Mirror | | | | | | |
| $d_5 = -12.500$ | | | | | | | |
| $r_6 = -27.500$ | Mirror | | | | | | |

Mirror 1 (concave primary, $r = -40.0$):
  Clear diameter = 8.8 inches
  Thickness = 1.5 inches
  Diam. central hole = 3.0 inches (clear)
  Material = Pyrex
Mirror 2 (convex secondary, $r = -27.5$):
  Clear diameter = 3.6 inches (.05 to .10 holding margin)
  Thickness = .75 inch
  Material: Pyrex Where:
$r$ is the radius length for an element surface;
$d$ is the axial thickness of an element;
C-1 is a type of crown glass well known in the art;
DBC-1 is a type of dense barium crown glass well known in the art;
$V = \frac{N_D - 1}{N_F - N_C}$;
$N_D$ is the index of refraction for the D line of sodium (5893 Å);
$N_C$ is the index of refraction for the C line of hydrogen (6563 Å);
$N_F$ is the index of refraction for the F line of hydrogen (4861 Å),
$N_h$ is the index of refraction for the h line of mercury (4047 Å); and
$N_{A'}$ is the index of refraction for the A' line of potassium (7665 Å).

3. A two mirror telescope comprising from rear to front, an apertured concave primary mirror, a secondary coaxial convex mirror of smaller diameter positioned to reflect light through the aperture in said primary mirror to an image field behind said primary mirror, and a compound zero power corrector lens in front of said secondary mirror and transmitting light to said primary mirror past said secondary mirror, said zero power lens consisting of a central equi-concave flint glass element flanked by two identical crown glass elements having convex surfaces cemented to the concave surfaces of said central element, said telescope having the following prescription:

| Prescription | | V | $N_D$ | $N_C$ | $N_F$ | $N_h$ | $N_{A'}$ |
|---|---|---|---|---|---|---|---|
| $r_1 = 136.59$ | | | | | | | |
| $d_1 = 1.00$ | C-1 (cemented) | 58.6 | 1.5230 | 1.52036 | 1.52929 | 1.53819 | 1.51729 |
| $r_2 = -22.235$ | | | | | | | |
| $d_2 = 1.00$ | DBC-1 (cemented) | 58.8 | 1.6110 | 1.60793 | 1.61832 | 1.62837 | 1.60439 |
| $r_3 = 22.236$ | | | | | | | |
| $d_3 = 1.00$ | C-1 | 58.6 | 1.5230 | 1.52036 | 1.52929 | 1.53819 | 1.51729 |
| $r_4 = -136.59$ | | | | | | | |
| $d_4 = 38.50$ | | | | | | | |
| $r_5 = -40.000$ | Mirror | | | | | | |
| $d_5 = -12.500$ | | | | | | | |
| $r_6 = -27.500$ | Mirror | | | | | | |

Mirror 1 (concave primary, $r = -40.0$):
  Clear diameter = 8.8 inches
  Thickness = 1.5 inches
  Diam. central hole = 3.0 inches (clear)
  Material = Pyrex Mirror 2 (convex secondary, $r = -27.5$):
  Clear diameter = 3.6 inches (.05 to .10 holding margin)
  Thickness = .75 inch
  Material: Pyrex
$f' = 44.47$ inches
$U'_M = 5.160°$, sin $U'_M = .08994$, f/6.4
Rear surface of mirror 1 to focal plane = 2.9 inches
Full field = 1°

Where
$r$ is the radius length for an element surface;
$d$ is the axial thickness of an element;
C-1 is a type of crown glass well known in the art;
DBC-1 is a type of dense barium crown glass well known in the art;
$$V = \frac{N_D - 1}{N_F - N_C};$$
$N_D$ is the index of refraction for the D line of sodium (5893 Å.);
$N_C$ is the index of refraction for the C line of hydrogen (6563 Å.);
$N_F$ is the index of refraction for the F line of hydrogen (4861 Å.);
$N_h$ is the index of refraction for the h line of mercury (4047 Å.);
$N_{A'}$ is the index of refraction for the A' line of potassium (7665 Å.);
$f'$ is the focal length; and
$U'_M$ is the angle that a marginal ray makes with the optical axis after leaving the last element.

PHILIP H. TAYLOR.

REFERENCES CITED

The following references are of record in the file of this patent:

UNITED STATES PATENTS

| Number | Name | Date |
|---|---|---|
| 1,446,634 | Bell et al. | Feb. 27, 1923 |
| 1,556,982 | Wiedert | Oct. 13, 1925 |
| 1,967,214 | Acht | July 24, 1934 |
| 2,141,884 | Sonnefeld | Dec. 27, 1938 |
| 2,336,379 | Warmisham | Dec. 7, 1943 |
| 2,350,112 | Houghton | May 30, 1944 |

FOREIGN PATENTS

| Number | Country | Date |
|---|---|---|
| 721,462 | Germany | June 10, 1942 |
| 883,937 | France | Apr. 5, 1943 |
| 61,355 | Denmark | Sept. 27, 1943 |